United States Patent
Constable

[15] 3,667,589
[45] June 6, 1972

[54] CONVEYING SYSTEM HAVING AN AUTOMATICALLY DEACTIVATED DRIVE

[72] Inventor: Charles F. Constable, South Milwaukee, Wis.

[73] Assignee: Jos. Schlitz Brewing Company, Milwaukee, Wis.

[22] Filed: Apr. 1, 1970

[21] Appl. No.: 24,611

[52] U.S. Cl. ............................................................198/127
[51] Int. Cl. ..........................................................B65g 13/02
[58] Field of Search..................198/127, 34; 192/56 R; 64/29

[56] References Cited

UNITED STATES PATENTS

| 295,595 | 3/1884 | Tilton | 64/29 |
| 275,186 | 4/1883 | Gass | 64/29 |
| 1,703,943 | 3/1929 | Manker | 198/127 R |
| 2,602,536 | 7/1952 | Eggleston | 198/127 R |
| 3,327,837 | 6/1967 | Covell | 198/127 |
| 2,100,552 | 11/1937 | Ripsch | 192/56 R |
| 2,497,893 | 2/1950 | Linahan | 192/56 R |

Primary Examiner—Edward A. Sroka
Attorney—Andrus, Sceales, Starke & Sawall

[57] ABSTRACT

A conveying system including a series of conveyor sections with each conveying section including a series of rolls to support the articles being conveyed. At least one roll of the series is a drive roll. A drive shaft extends longitudinally of the conveyor sections and the drive shaft is individually connected to each drive roll through a clutch which is arranged to disengage the driving connection to each drive roll under predetermined overload conditions. Means is also provided for returning the clutch to an engaged position after a predetermined period of disengagement, whereby the clutch will reengage if the overload condition has been cured and will again disengage if the overload condition continues to exist.

5 Claims, 4 Drawing Figures

PATENTED JUN 6 1972
3,667,589
SHEET 1 OF 2
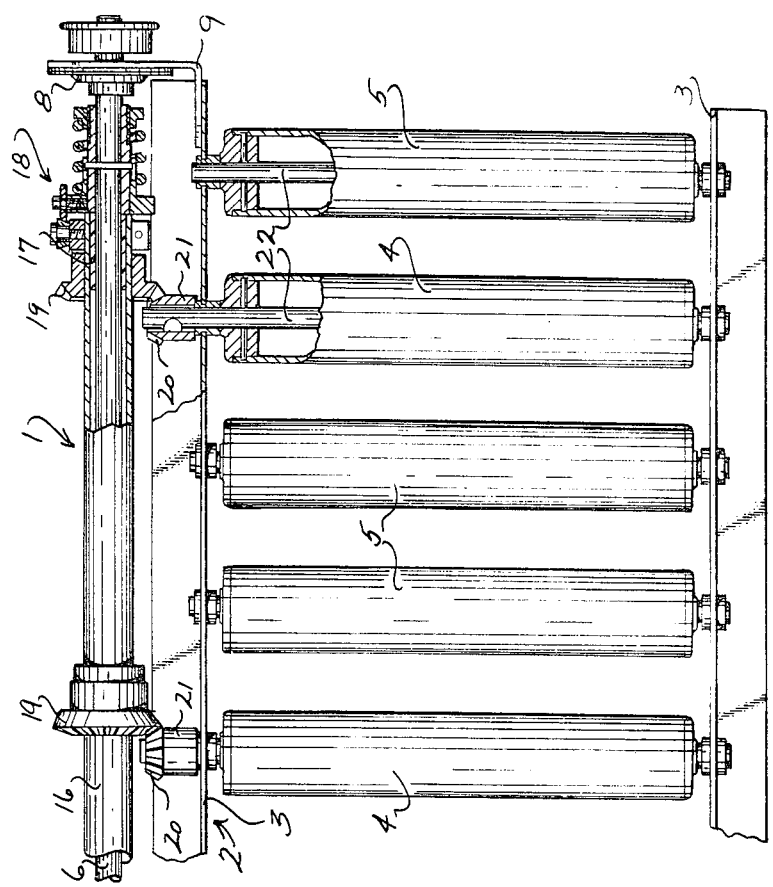
Fig. 1
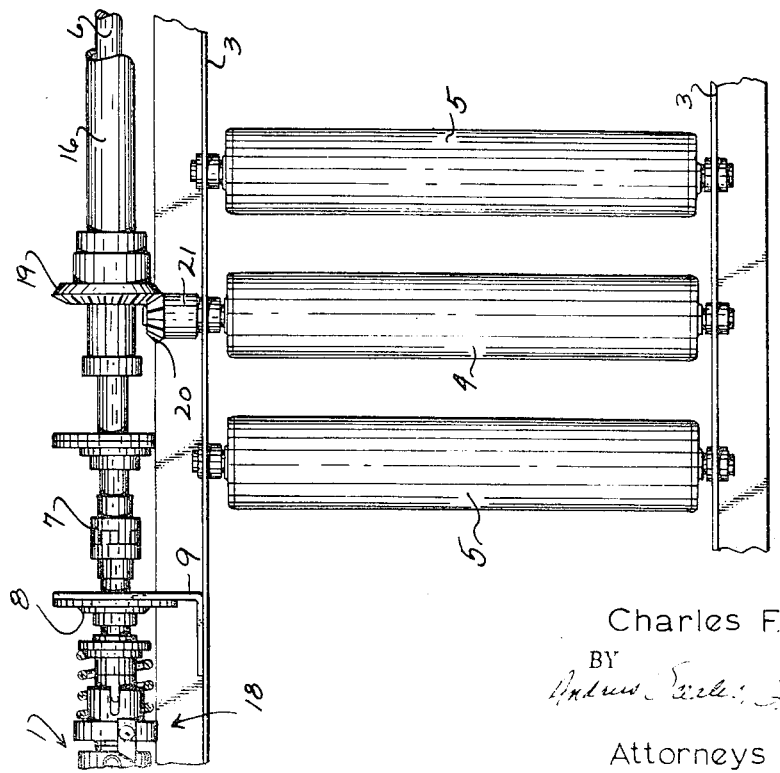
INVENTOR.
Charles F. Constable
BY
Attorneys

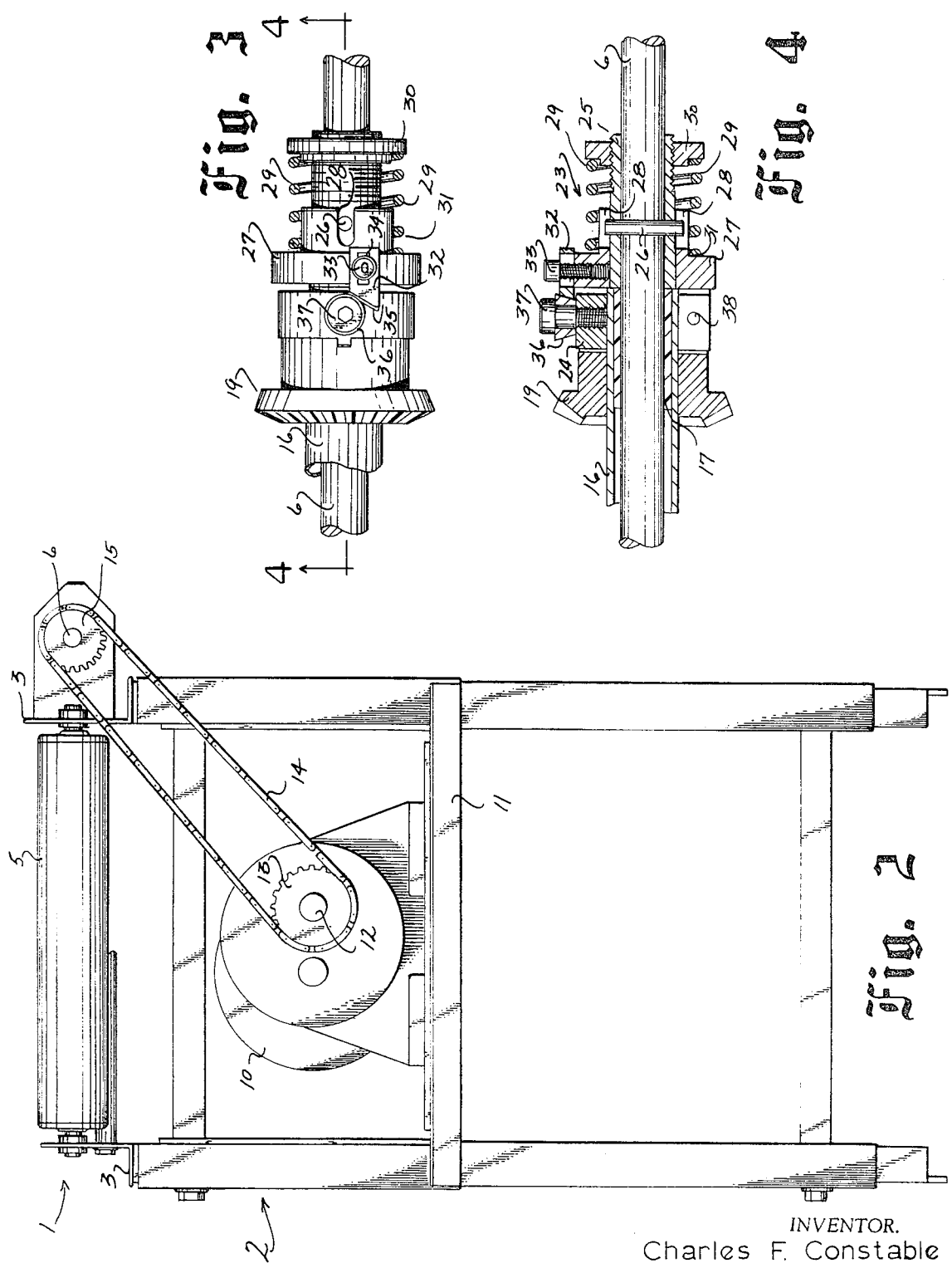

CONVEYING SYSTEM HAVING AN AUTOMATICALLY DEACTIVATED DRIVE

This invention relates to a conveyor system, and more particularly to an endless conveyor driven by a series of drive rolls in which the driving force applied to the rolls is disengaged under pre-set overload conditions.

The conventional conveyor system for conveying articles or packages includes a series of rolls, and a number of the rolls are driven to move the articles along the conveyor. If a back-up occurs in the conveyor system and the articles are unable to move, it is desirable to disengage the drive rolls so that the driving force applied to the articles through the drive rollers is reduced to the point where accumulative pressure on the leading articles on the conveyor is not excessive, that is, not sufficient to damage the articles or cause other problems which might arise from a heavy build-up pressure. When the backup is cured and the articles are free to be conveyed in their normal manner, the drive should resume its full power transmission to the drive rolls. In other words it is desired that the conveyor system be self-deactivated by a back-up condition and be automatically reactivated when the backup is relieved.

To provide self-deactivation under backup or overload conditions, various mechanisms have been incorporated in the past with conveyor systems, such as slip clutch mechanisms and pivoting drive rolls in which the drive rolls pivot to an inoperative position during overload conditions. The prior art deactivation systems normally operated in a manner such that slippage occurred under overload conditions, and the systems were quite complicated from a mechanical standpoint and therefore expensive to install and maintain.

The present invention is directed to an improved conveyor system having means for automatically deactivating the drive rolls under overload conditions and for automatically reactivating the drive rolls to full power transmission when the overload condition is cured. More specifically, the conveying system of the invention includes a series of conveyor sections with each conveyor section including one or more drive rolls. A drive shaft extends longitudinally along the conveyor sections and a series of sleeves are journalled about the drive shaft with each sleeve being substantially coextensive with each conveyor section. Each sleeve is independently driven from the drive shaft through a clutch mechanism. If a back-up condition arises causing an overload on the drive rolls, each clutch will independently disengage to disconnect the drive roll from the main drive shaft. When the overload condition is cured, each clutch will again independently reengage the drive roll with the drive shaft to re-establish full power transmission to the drive roll.

The clutch mechanism is a novel construction which acts to disengage the driving connection for a predetermined period of time and includes a pair of clutch members, one of which is secured to the drive shaft and the other secured to the sleeve. A cam is mounted on one of the clutch members and is adapted to engage a follower secured to the other clutch member. An adjustable spring is utilized to bias the cam and the follower into engagement so that under normal load conditions the driving force will be transmitted from one clutch member to the other through the cam and follower arrangement. However, under overload conditions, in which the overload exceeds the spring force, the cam and follower will be disengaged and the clutch member associated with the drive shaft will rotate freely 360° until the cam and follower again make contact. If the overload condition is cured when the cam again makes contact with the follower after 360° of rotation, the driving engagement will be reengaged, but if the overload condition still exists the clutch member associated with the drive shaft will again rotate freely through another 360° revolution. With this construction the clutch members will be completely disengaged for a pre-determined time interval equivalent to the period of time required for the drive shaft to rotate 360° and on completion of the 360° rotation the clutch members will attempt to reengage. This insures that there will be no load on the drive rollers during the time interval required for the 360° rotation of the drive shaft during the disengaged condition.

As a further advantage of the invention, the clutch mechanisms associated with each conveyor section are arranged so that they will disengage and reengage at different positions of rotation of the drive shaft. To provide this function, the cam of each clutch member is displaced angularly from the cams of clutch members associated with adjacent conveyor sections so that the engagement and disengagement of the clutch members will occur at different angular displacements of the drive shaft. This construction insures that the load will be picked up gradually when the overload condition is cured, rather than each conveyor section being reengaged with the drive shaft at the same instant.

Other objects and advantages will appear in the course of the following description.

The drawings illustrate the best mode presently contemplated of carrying out the invention.

In the drawings:

FIG. 1 is a plan view with parts broken away in section showing a portion of the conveyor system of the invention;

FIG. 2 is an end view of the conveyor system shown in FIG. 1;

FIG. 3 is a plan view of the clutch mechanism associated with one of the conveyor sections; and FIG. 4 is a section taken along line 4—4 of FIG. 3.

The drawings illustrate a conveyor system including a series of conveyor sections 1 that are located in end-to-end relation. Each conveyor section is composed of a structural frame 2 including a pair of parallel spaced side members 3. One or more drive rolls 4 are journalled between the side members 3 and similarly a series of idler rolls 5 are also journalled between the side members. FIG. 1 illustrates three drive rolls 4 associated with the conveyor section but in practice it is contemplated that each alternate roll can be a drive roll or every third or fourth roll can be a drive roll, depending upon the nature of the conveyor system and the articles being conveyed.

To rotate the drive rolls 4 a shaft 6 extends longitudinally along the conveyor sections 1, and the shaft 6 can be composed of a series of sections which are coupled together by couplings 7.

The shaft 6 is journalled for rotation in bearings 8 which are supported in generally L-shaped brackets 9 secured to the side members 3. To rotate the drive shaft 6, a motor and speed reducing unit 10 is mounted on a series of cross members 11 of frame 2 and the drive shaft 12 of the motor and speed reducing unit 10 carries a sprocket 13 that is connected by chain 14 to a sprocket 15 secured to the drive shaft 6. Thus, rotation of the drive shaft 12 is transmitted through the chain drive to the shaft 6.

A series of sleeves 16 are journalled around the drive shaft 6 by bearings 17. As shown in the drawing there is a sleeve 16 for each conveyor section 1 and the sleeves 16 are generally coextensitve in length with the conveyor sections.

Rotation of the drive shaft 6 is transmitted to each sleeve 16 through a clutch mechanism 18, and the sleeve carries a series of bevel gears 19 which engage and drive a series of bevel gears 20 attached to hubs 21 carried by the ends of the shafts 22 of drive rollers 4. Thus, rotation of the drive shaft 6 is transmitted through the clutch mechanism 18 to the sleeve 16 and rotation of the sleeve is transmitted through the bevel gears to drive the drive rollers 4 and move the articles along the conveyor.

If a blockage occurs downstream of the conveyor system so that the conveyed articles cannot be moved, the driving force applied to the articles by the drive rollers 4 can cause an accumulation of pressure on the leading articles on the conveyor, resulting in damage to the articles or overloading of the drive. Thus, the clutch mechanism 18 is employed to disengage the drive under a predetermined overload condition. When the overloading is cured, the clutch will again be engaged to restore full power transmission to the drive rollers 4.

The clutch mechanism 18 is best illustrated in FIGS. 3 and 4, and includes a pair of clutch members 23 and 24 with clutch member 23 being attached to the shaft 6. Clutch member 23 includes an inner sleeve or tube 25 which is secured to the shaft 6 by a pin 26 that extends through aligned openings in the shaft and the sleeve 25. A flanged ring 27 is mounted on the sleeve 25 and the ends of the pin 26 extend within longitudinally extending slots 28 in the ring 27. This slotted connection serves to transmit rotation of the drive shaft 6 to the ring 27 but permits the ring to move axially of the shaft 6.

A coil spring 29 is positioned between an adjustable nut 30 threaded on the outer end of the sleeve 25 and the flange 31 of ring 27. The spring acts to urge or bias the ring 27 of clutch member 23 toward the clutch member 24 and adjustment of the nut 30 on the sleeve 25 serves to vary the spring force.

Mounted on the outer periphery of the ring 27 is a cam 32. A stud 33 extends through a slot 34 in the cam and is threaded within an opening in the flange 31 of ring 27. The slot 34 permits a degree of longitudinal adjustment of the cam for wear.

As best illustrated in FIG. 4, cam 32 is provided with an inclined surface 35 that is adapted to engage the periphery of a follower 36 that is mounted on the clutch member 24. As shown in FIG. 3, the follower has a generally frusto-conical configuration and is freely mounted on the stud 37 that is threaded within an opening in the clutch member 24. Clutch member 24 is a split ring with the halves being connected together by a bolt 38 to secure the clutch member to the sleeve 16. The bevel gear 19 is keyed to the clutch member 24 so that the bevel gear will rotate in unison with the clutch member 24 and the sleeve 16.

Under normal loading conditions, the engagement of the inclined surface 35 of cam 32 with the follower 36 will provide a driving connection between the clutch members 23 and 24 to thereby transmit rotation from the drive shaft 6 to the sleeve 16. However, under overload conditions, due to a blockage on the conveyor system, the inclined cam surface 35 will ride across the follower 36 against the force of the spring 29 to disengage the cam 32 from the follower 36. With the cam and follower disengaged there is no contact between the clutch members 23 and 24 so that the clutch member 23 will rotate with shaft 6 through approximately 360°, at which time the inclined surface 35 of the cam will again engage the follower 36. If the overload condition has been cured during the time required for the shaft 6 to rotate 360° the cam 32 will maintain engagement with the follower 36 to provide the driving connection from the shaft 6 to the sleeve 16.

However, if the overload conditions continue to exist, the inclined surface 35 of the cam 32 will again ride across the follower 36 to disengage the connection and permit the clutch member 23 and the shaft 6 to again rotate through 360° before making another attempt for engagement. Thus, the two clutch members 23 and 24 are completely disengaged for a predetermined period of time which is that period required for the shaft 6 to revolve 360°. If the overload condition is not cured re-engagement of the clutch members will not be effected and the clutch members will again be completely disengaged for a second period of time required for a second 360° rotation of the shaft.

The force necessary to provide disengagement of the cam and the follower 36 can be adjusted by threading the nut 30 on the sleeve 25, and this adjustment provides a convenient method of varying the preset overload conditions required for disengagement of the drive mechanism.

It is desirable to provide an angular displacement of the cam 32 of the clutch mechanism of one sleeve 16 with respect to the cams of the clutch mechanisms of adjacent sleeves, as shown in FIG. 1. By providing this angular displacement between cams it will insure that the clutch mechanism for each sleeve 16 will be engaged and disengaged at a different interval during rotation of the drive shaft 6. This is an advantage particularly during engagement in that the drive for each conveyor section will be progressively picked-up rather than having the drive for all conveyor sections picked-up at the same instant after the overload condition is cured.

It is contemplated that the conveyor system of the invention can be utilized for conveying any type of articles such as cases, pallets, packages, and the like, and is particularly adaptable for use with relatively heavy articles and with articles of a relatively fragile nature which can be damaged by accumulative pressure on the leading articles in the event of a back-up.

While the drawings illustrate a single cam 32 and a single follower 36, it is contemplated that a number of cams or followers can be associated with each clutch member in which case the disengagement of the drive will be affected through an arc of rotation of the drive shaft of less than 360°.

Various modes of carrying out the invention are contemplated as being within the scope of the following claims particularly pointing out and distinctly claiming the subject matter which is regarded as the invention.

I claim:

1. In a conveyor system, a conveyor including a pair of drive members disposed at spaced intervals along the length of the conveyor and disposed to support and convey articles, a shaft extending longitudinally of the conveyor, connecting means individually connecting the shaft with each drive member, disengaging means for individually disengaging each connecting means under predetermined overload conditions encountered by the respective drive member, and means responsive to a predetermined time interval for returning said connecting means to an engaged position whereby each connecting means will retain engagement if the overload condition has been cleared and will disengage if the overload condition continues to exist, the engaging and disengaging means associated with the first drive member being arranged so that the connecting means of the first drive member is engaged and disengaged at a different time interval from the connecting means associated with the second drive member.

2. In a conveying system, a series of conveyor sections to support and convey articles and disposed in end-to-end relation, each conveyor section including a plurality of rotatable drive members, a shaft extending longitudinally of the conveyor sections, a series of sleeves journalled on the shaft with each sleeve being substantially coextensive in length with a conveyor section, connecting means for connecting each sleeve with the corresponding drive members of that conveyor section, clutch means interconnecting each sleeve with the shaft, said clutch means having an engaged position in which rotation of the shaft is transmitted to the respective sleeve to drive the drive members of that conveyor section, and having a disengaged position wherein rotation of the shaft is not transmitted to the respective sleeve, means for disengaging each clutch means under a predetermined overload condition whereby all of the drive members associated with that conveyor section will be deactivated, and means for moving said clutch means to the engaged position after a predetermined period of disengagement whereby said clutch means will retain engagement if the overload condition has been cured and will disengage if the overload condition continues to exist.

3. The conveying system of claim 2, wherein said clutch means includes a first clutch member secured to said shaft and a second clutch member secured to the sleeve, means for biasing the clutch members into driving engagement, a projection on one of said clutch members, and an abutment disposed on the other of said clutch members, said abutment being disposed to engage said projection during normal load conditions to provide a driving connection between said clutch members and said abutment arranged to disengage said projection under overload conditions thereby permitting said first clutch member to rotate freely with respect to said second clutch member and said sleeve.

4. In a conveyor system, a series of conveyor sections disposed in end-to-end relation and adapted to support and convey articles, each conveyor section including a drive roller, a shaft extending longitudinally of the conveyor sections, connecting means individually connecting the shaft with each drive roller, disengaging means for individually disengaging each connecting means under predetermined overload conditions, and engaging means for returning said connecting means to an engaged position after a predetermined time interval whereby each connecting means will retain engagement if the overload condition has been cured and will disengage if the overload condition continues to exist, said engaging and disengaging means being arranged so that the connecting means of each conveyor section is returned to the engaged position after a predetermined arc of rotation of said shaft, and the connecting means of each section is engaged and disengaged at different sectors in the rotation of said shaft.

5. The system of claim 4, wherein each connecting means is returned to the engaged position after approximately 360° of rotation of said shaft.

* * * * *